US005168289A

United States Patent [19]

Katakabe et al.

[11] Patent Number: 5,168,289

[45] Date of Patent: Dec. 1, 1992

[54] THERMAL TRANSFER RECORDING APPARATUS HAVING INTERMEDIATE TRANSFER MEDIUM

[75] Inventors: Noboru Katakabe, Uji; Atsushi Sogami, Sanda; Masanori Yoshikawa, Mino, all of Japan

[73] Assignee: Matsushita Electric Industrial Co., Ltd., Osaka, Japan

[21] Appl. No.: 461,071

[22] Filed: Jan. 4, 1990

[30] Foreign Application Priority Data

| | | | |
|---|---|---|---|
| Jan. 13, 1989 | [JP] | Japan | 1-7243 |
| Apr. 5, 1989 | [JP] | Japan | 1-86207 |
| May 29, 1989 | [JP] | Japan | 1-134933 |

[51] Int. Cl.$^5$ .......... G01D 15/16; B41M 5/28

[52] U.S. Cl. .......... 346/76 PH; 400/120

[58] Field of Search .......... 346/76 PH; 400/120 PH

[56] References Cited

U.S. PATENT DOCUMENTS

| | | | |
|---|---|---|---|
| 3,554,836 | 1/1971 | Steindorf | 156/240 |

FOREIGN PATENT DOCUMENTS

| | | | |
|---|---|---|---|
| 59-16932 | 4/1984 | Japan . | |
| 0272174 | 12/1986 | Japan | 346/76 PH |
| 0284462 | 12/1986 | Japan | 346/76 PH |
| 0080065 | 4/1987 | Japan | 400/120 |
| 0109669 | 5/1987 | Japan . | |
| 0132680 | 6/1987 | Japan . | |
| 62-47717 | 10/1987 | Japan . | |
| 63-50198 | 10/1988 | Japan . | |
| 1115082 | 5/1968 | United Kingdom . | |

OTHER PUBLICATIONS

Patent Abstracts of Japan, vol. 10, No. 216 (M-502) [2272], Jul. 29, 1986; and JP-A-61 054 963 (Canon Inc.) Mar. 19, 1986.

Patent Abstracts of Japan, vol. 10, No. 234 (M-507) [2290], Aug. 14, 1986; and JP-A-61 068 270 (Fuji Xerox Co.) Apr. 8, 1986.

Patent Abstracts of Japan, vol. 11, No. 155 (M-589) [2602], May 20, 1987; and JP-A-61 284 462 (Sharp Co.) Dec. 15, 1986.

*Primary Examiner*—Benjamin R. Fuller

*Assistant Examiner*—Huan Tran

*Attorney, Agent, or Firm*—Wenderoth, Lind & Ponack

[57] ABSTRACT

A recording apparatus causes an ink sheet coated with thermoplastic ink to come into contact with an intermediate transfer medium having its outer surface composed of a silicone elastomer film, and then causes a thermal-image formation head to selectively heat the ink in contact with the intermediate transfer medium so that the ink can selectively adhere to the intermediate transfer medium. A complete ink image is formed on a recording paper by stripping off the ink sheet from the intermediate transfer medium while the temperature of the heated ink still remains above the melting point or softening point. These sequential processes are repeatedly executed for plural color inks in the order to form a multi-color ink image on the intermediate transfer medium before transferring the multicolor ink image onto the recording paper.

4 Claims, 6 Drawing Sheets

THERMAL TRANSFER RECORDING APPARATUS HAVING INTERMEDIATE TRANSFER MEDIUM

BACKGROUND OF THE INVENTION

1. Field of the Invention

The present invention relates to a recording apparatus which is usable in a printer, a digital copying apparatus, or a facsimile device, for recording a desired image or character on a recording paper. More particularly, the present invention relates to a recording apparatus which is useful for precisely recording a color image and character.

2. Description of the Prior Art

Recently, as an image recording system for use with a printer, a thermal transfer recording system using a thermal head and a ink sheet has been available in the market. Such a system is disclosed in, for example Japanese Laid-Open Patent Publication No. 62-47717 and Japanese Laid-Open Patent Publication No. 63-50198.

An example of a conventional recording apparatus using such a thermal transfer recording system is described below.

FIG. 10 illustrates a sectional structural diagram of the conventional recording apparatus. The reference numeral 101 designates a thermal head incorporating a plurality of resistive heating elements 109 which are arranged in the widthwise direction of recording paper 103. The reference numeral 104 designates an ink sheet made of a film substrate coated with thermally soluble or softening ink (hereinafter called thermally soluble ink) over the upper surface thereof. The thermal head 101 is pressed against a platen 102, and the ink coated surface of the ink sheet 104 faces the recording paper 103. In this condition, by causing the platen 102, the recording paper 103, and the ink sheet 104 to move in the direction of the illustrated arrows, the resistive heating elements 109 generate heat according to a recording signal so as to melt or soften (hereinafter simply melt) the ink opposing the resistive heating elements 109. Then, the ink sheet 104 is separated from the recording paper 103 to form an ink image 105 on the recording paper 103.

However, with the conventional recording apparatus having the above structure, ink cannot properly adhere to a recording paper which has insufficient superficial smoothness. This in turn results in a poor image quality since the ink often drops from the recording paper 103. In particular, when performing the color-superimposed image recording in the manner proposed by Japanese Laid-Open Patent Publication No. 63-50198, since the ink itself generates concave and convex surface structures, a color super-imposed on preceding colors cannot be easily deposited on the recording paper. Furthermore, the recording paper easily displaces itself, and thus, perfect matching of a color position can hardly be carried out by the conventional recording apparatus.

To improve the image recording characteristics when using normal recording paper, there is a method of repeating the transfer of the ink image on the recording paper after once forming an ink image on an intermediate transfer medium, as was proposed by Japanese Laid-Open Patent Publication No. 59-16932. Nevertheless, the ink cannot be fully transferred from the intermediate transfer medium onto the recording paper, thereby causing residual ink to remain on the intermediate transfer medium, and as a result, it is necessary to clean the intermediate transfer medium.

SUMMARY OF THE INVENTION

A primary object of the present invention is to fully solve those problems mentioned above by providing a novel recording apparatus which can reliably record a quality image, even on recording paper having a poor smoothness, at a very fast speed and which can dispense with cleaning and maintenance procedures.

Another object of the present invention is to provide a novel color recording apparatus which can reliably achieve a perfect color-to-color superimposition and which can precisely match a color position in the course of color recording, and yet, which can record a quality color image by employing a simple structure.

To fully solve those problems mentioned above, a recording apparatus embodied by the invention includes an intermediate transfer medium whose surface is composed of a silicone elastomer layer, an ink sheet whose base film is fully coated with thermally soluble ink, an ink transfer means which sequentially transfer the ink sheet to a position in which the ink sheet is brought into contact with the intermediate transfer medium, a thermal-image formation means which selectively heats the intermediate transfer medium for causing the ink to selectively adhere to the intermediate transfer medium to form an ink image on the intermediate transfer medium, and a transfer means which includes a pressing means for pressing the ink-image-formed intermediate transfer medium against recording paper to transfer the ink image onto the recording paper. The recording apparatus embodied by the invention precisely forms an ink image on the intermediate transfer medium by separating the ink sheet from the intermediate transfer medium while the temperature of the ink, which is heated above the melting or softening point (hereinafter called simply the melting point) by the thermal-image formation means still, remains above the melting point.

A color recording apparatus embodied by the present invention initially forms a variety of color-ink images on an intermediate transfer medium covered with a silicone elastomer layer by sequentially superimposing color-ink images, and thereafter forms a multicolor ink image on recording paper by performing a single step image transfer process. Furthermore, the color recording apparatus embodied by the present invention uses selected color ink materials each having a different viscosity for executing color-image recording by sequentially superimposing the ink materials on the intermediate transfer medium in the order of a higher viscosity material to the a lower viscosity material.

As mentioned above, the recording apparatus embodied by the present invention uses a silicone elastomer layer for composing the intermediate transfer medium featuring perfect pliability and smooth releasing property. As a result, the transferable ink image perfectly fits recording paper having a rough surface, thus ensuring a formation of unsurpassed quality image on all recording paper available today. Furthermore, since no residual ink remains on the intermediate transfer medium, no cleaning device is necessary.

Since the recording apparatus embodied by the invention separates the ink sheet from the intermediate transfer medium while the temperature of the melted ink remains above the melting point on the intermediate transfer medium throughout the recording process after adhesion of the ink which is melted by thermal-image formation means onto the intermediate transfer medium, a distinctly sharp ink image can be formed on the silicone elastomer layer having a smooth mold-releasing property.

In addition, since the color image recording apparatus embodied by the present invention sequentially records a variety of color images on the intermediate transfer medium by sequentially superimposing them before transferring them onto the recording paper, a distinctly sharp color image can securely be recorded without causing the colors to displace themselves.

Furthermore, since the color image recording apparatus embodied by the present invention uses a variety of color inks of different viscosity and sequentially superimposes them on the intermediate transfer medium in the order of the viscosity, the ink superimposed on the upper layer can easily be sheared to ensure satisfactory color-to-color superimposition.

DESCRIPTION OF THE PREFERRED EMBODIMENTS

Referring now more particularly to the accompanying drawings, preferred embodiments of the recording apparatus according to the invention will be described below.

Figure 1:
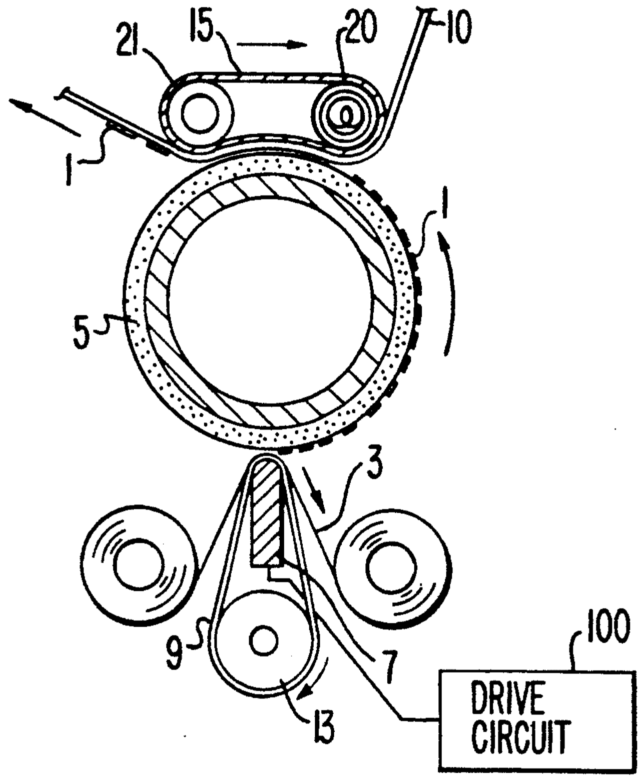
FIG. 1 illustrates a sectional view of a recording apparatus reflecting a first embodiment of the invention.
Figure 2:
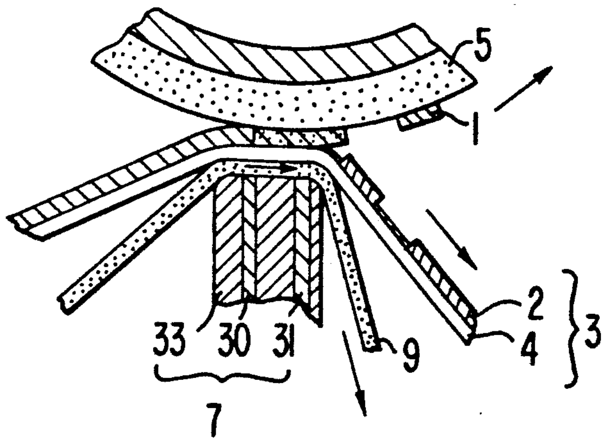
FIG. 2 illustrates a process for generating an ink image using the recording apparatus of the first embodiment.
Figure 3:
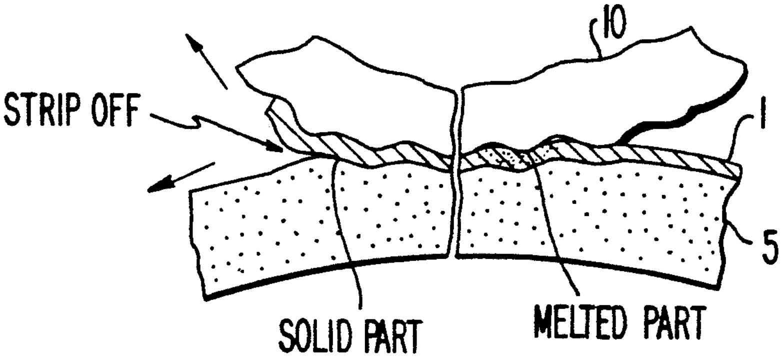
FIG. 3 illustrates a process for transferring the ink image using the recording apparatus of the first embodiment.
Figure 4:
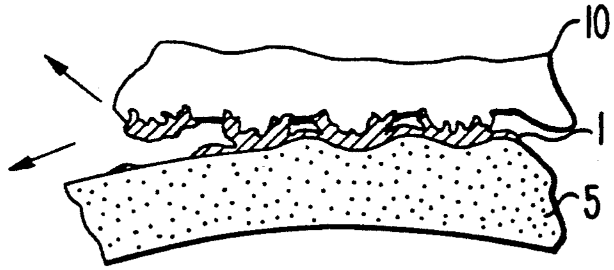
FIG. 4 illustrates a condition in which faulty image-transfer occurs while the transfer process is underway.

FIG. 1 illustrates a sectional view of a recording apparatus reflecting a first embodiment of the present invention. FIG. 2 illustrates a process for generating an ink image using the recording apparatus of the first embodiment. FIG. 3 illustrates a process for transferring the ink image using the recording apparatus of the first embodiment. FIG. 4 illustrates a condition in which faulty image-transfer occurs while the transfer process is underway.

The ink sheet 3 shown in FIGS. 1 and 2 is made of a plastic base film 4 having a thickness of 3 μm through a maximum of 9 μm of thickness, which is uniformly coated with a thermally-soluble, or thermoplastic, ink 2. To compose the thermally-soluble ink, a coloring agent like carbon black is dispersed in a binder which is made of either a natural wax or a synthetic wax or a thermoplastic resin, like a polyamide resin or a polyacrylic resin for example.

It is preferable that the thermally-soluble ink has a melting point ranging from 50° C. to a maximum of 160° C. If the ink were composed of a binder having an uncertain melting point, the softening point of the ink may be in a range from 40° C. to a maximum of 180° C. as per the specification of JIS K2351 "Ring & Ball Method".

The reference numeral 7 designates a multistylus head incorporating a plurality of stylus electrodes 30 disposed in a row in the widthwise direction and a common electrode 31 opposing the electrodes 30, which are respectively embedded in a supporting material 33. The reference numeral 9 designates a resistive sheet which is endlessly installed around the multistylus head 7 and a roller 13. The reference numeral 5 designates an intermediate transfer drum whose surface is composed of a silicone rubber layer.

An example of a known silicone elastomer layer is shown in U.S. Pat. No. 3,554,836. It is preferable that the silicone rubber layer has 30 through 70 degrees of hardness and a minimum of 0.2 mm of thickness.

The multistylus head 7 is disposed so that it can tightly be pressed against the intermediate transfer drum 5 through the resistive sheet 9 and the ink sheet 3. While the recording process is underway, both the resistive sheet 9 and the ink sheet 3 continuously move themselves in the directions shown by the arrows in relation to the rotation of the intermediate transfer drum 5. The reference numerals 20, 21 and 15 designate a heating roller, a guide roller and an endless belt, respectively. When transferring an ink image from the intermediate transfer drum 5 onto recording paper 10, the endless belt 15, receiving tension from the heating roller 20 and the guide roller 21, moves in the direction of the arrow while pressing the intermediate transfer drum 5 together with the heating roller 20 and the guide roller 21 via the recording paper 10.

Next, the functional operation of the recording apparatus embodied by the present invention is described below. First, the multistylus head 7 comes into contact with the resistive sheet 9 and tightly presses against the intermediate transfer drum 5 via the ink sheet 3. When a recording signal produced by a drive circuit 100 is applied to the electrodes 30 in the above condition, current flows between the electrodes 30 and the common electrode 31 to cause the resistive sheet 9 to partially generate a heat distribution in response to the recording signal. When the resistive sheet 9 generates heat, ink 2 opposing the heated portion of the resistive sheet 9 melts, and then, only the melted ink adheres to the surface of the intermediate transfer drum 5. While this condition is present, the intermediate transfer drum 5, the ink sheet 3, and the resistive sheet 9 sequentially move themselves in the directions of the arrows. In the meanwhile, only the ink sheet 3 leaves the intermediate transfer drum 5. At the same time, the multistylus head 7 causes the resistive sheet 9 to generate heat at the portion close to the right edge of the multistylus head 7. It is preferable that the recording cycle of the multistylus head 7 be as short as possible, for example, to be a maximum of 1 to 2 ms/line, so tha the ink sheet 3 can leave the intermediate transfer drum 5 immediately after melting of the ink 2. The ink sheet 3 is stripped off from the intermediate transfer drum 5 immediately after passed through the head 7 by bending the ink sheet 3 to be conveyed in a direction at an angle relative to the moving direction of the surface of the intermediate transfer drum 5. It is also preferable that the position in which the ink sheet 3 is stripped from the intermediate transfer drum 5 be within 2 to 3 lines pitches (one-line pitch corresponds to one-picture-element pitch in the direction of the rotation of the intermediate transfer drum 5) from the recording position (the position at which the resistive sheet 9 generates heat). Due to the mechanism mentioned above and by causing the ink sheet 3 to leave the intermediate transfer drum 5 immediately after the melting of ink 2, the melted ink 2 remains in a melted state at the moment the ink sheet 3 is separated from the intermediate transfer drum 5. As a result, the melted ink 2 stuck on the intermediate transfer drum 5 is easily separated from the solid ink 2, thus allowing the ink image 1 to be sucurely formed on the intermediate transfer drum 5.

While atmospherically being cooled, the ink image 1 recorded on the intermediate transfer drum 5 is delivered to the transfer section constituted by the heating roller 20, guide roller 21 and the endless belt 15. As soon as the ink image 1 arrives at the position right below the heating roller 20, the ink image 1 is pressed against the recording paper 10 held between the endless belt 15 and the intermediate transfer drum 5, where the recording paper 10 is warmed by the heating roller 20. Next, both the ink image 1 and the recording paper 10 pressed by the endless belt 15 are carried forward by the movement of the endless belt 15. Meanwhile, the ink image 1 radiates heat to solidify itself in the sandwiched condition between the recording paper 10 and the intermediate transfer drum 5. As soon as the ink image 1 solidifies itself, the recording paper 10 is stripped off from the intermediate transfer drum 5 at the position where the guide roller 21 is present. This allows the ink image 1 which has adhered to the recording paper 10 to be stripped off from the intermediate transfer drum 5, without incurring even a slightest damage, to be transferred onto the recording paper 10. After completing the image transfer process, the previously utilized surface portion of the intermediate transfer drum 5 returns to the recording section to sequentially follow up those processes mentioned above so that subsequent ink images can be formed on the recording paper in correspondence with subsequent recording signals.

In order to reliably achieve 100% of the ink transfer rate throughout the transfer and stripping process, the first embodiment uses a pliable silicone rubber layer for composing the outer surface of the intermediate transfer drum 5. By tightly pressing the intermediate transfer drum 5 against the recording paper 10, the ink image 1 can securely adhere to the recording paper 10 in perfect compatibility with the concave and convex surface of the recording paper 10. Meanwhile, the intermediate transfer drum 5 remains in close contact with the recording paper 10 until the temperature of the ink image 1 lowers below the melting point. While the ink image 1 perfectly fits the concave and convex surface of the recording paper 10, the ink image 1 solidifies itself before the recording paper 10 is stripped off from the intermediate transfer drum 5. Compared to the dissolved condition, the solidified ink image 1 sharply promotes the shearing strength. As a result, there is no fear of causing the ink image 1 to be sheared. Due to the relatively weak adhesion of ink to the intermediate transfer drum 5 covered with the silicone rubber layer, the entire volume of the ink image 1 is transferred to the recording paper 10 having a relatively stronger adhesive property.

When the transfer process is under way, the transfer rate of the ink image 1 from the intermediate transfer drum 5 to the recording paper 10 is determined by those essential factors including the differential adhesion of the ink 2 against the intermediate transfer drum 5 and the recording paper 10, the shearing strength of the ink image 1, the bonding effect between the ink image 1 and the recording paper 10, and the thickness of the ink image 1. To promote the transfer rate, it is preferable for the system to use such a silicone rubber layer that has maximum pliability and ink-releasing property for composing the intermediate transfer drum 5. As shown in FIG. 3, it is preferable for the ink image 1 to maintain a constant thickness at the instant of the transfer without permeating the recording paper 10. As shown in FIG. 4, if the ink permeates the recording paper 10, an extremely thin film is locally generated. Since this portion can easily be sheared, the sheared ink remains on the intermediate transfer drum 5. To prevent this, it is preferable that a highly viscose ink 2 having an optimal thickness be used. Furthermore, in order to prevent the ink 2 from permeating the recording paper 10, it is preferable for the system to allow the melted ink to remain in contact with the recording paper 10 for a very short period of time, for exmaple, for a maximum of 0.2 second.

Based on those reasons mentioned above, the inventors have confirmed that quite satisfactory result was obtained from a test in which an ink 2 was used containing a minimum of 1,000 cp of the viscosity and formed a minimum of 2 $\mu m$ of film thickness. The formed ink film was cooled in a very short period of time before being stripped off from the intermediate transfer drum 5.

In order to achieve 100% or nearly 100% of the ink image transfer rate, it is preferable for the system to use a selected material having a satisfactory mold-releasing property for composing the intermediate transfer drum 5. However, in the process of forming the ink image 1 on the intermediate transfer drum 5, the adhesion strength is weak because of the outstanding ink-releasing property of the intermediate transfer drum 5. Following the solidification of cooled ink 2, even when forming the ink image 1 by stripping off the ink sheet 3 from the intermediate transfer drum 5, the adhesive force between the ink 2 and the intermediate transfer drum 5 is defeated by the shearing strength of the ink, and thus, the ink cannot be sheared. As a result, the ink image 1 cannot be transferred to the intermediate transfer drum 5.

While the image-forming process is underway, the recording apparatus embodied by the present invention separates the ink from the intermediate transfer drum 5 before the temperature of the melted ink lowers below the melting point. This causes the melted ink to weaken its cohesion, and thus, the melted ink can easily be sheared. As a result, even though the adhesion is too poor, the image recording system can precisely form the ink image accurately corresponding to the recording signal on the intermediate transfer drum 5.

With the first embodiment, a color image recording is also possible by using as the ink sheet a color ink sheet which is replaced in turn by another color ink sheet after image formation of each color on the intermediate transfer drum is completed to form a multi-color ink image on the intermediate transfer drum. Thereafter, the multi-color ink image is transferred to the recording paper.

Next, a second embodiment of the recording apparatus according to the present invention is described below.

Figure 5:
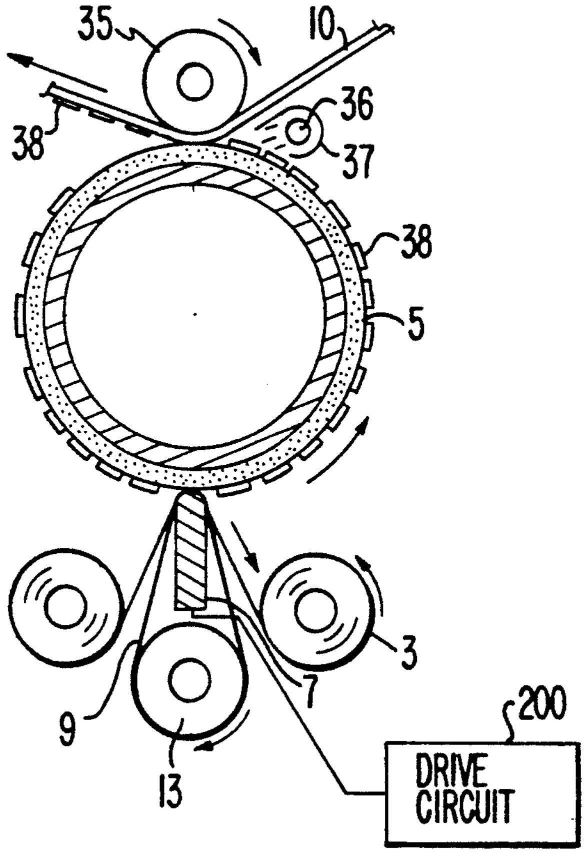
FIG. 5 illustrates a sectional view of a recording apparatus reflecting a second embodiment of the invention.
Figure 6:
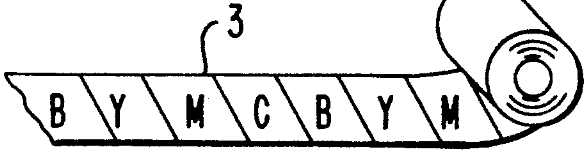
FIG. 6 illustrates a structure of an ink sheet used for recording color image for embodying the invention.

FIG. 5 illustrates a sectional view of a color recording apparatus reflecting the second embodiment. FIG. 6 illustrates a composition of a color ink sheet used for the color recording apparatus shown in FIG. 5. Like the embodiment shown in FIG. 1, the color recording apparatus shown in FIG. 5 includes the multistylus head 7, resistive sheet 9, roller 13, and ink sheet 3. While the intermediate transfer drum 5 rotates in the direction shown by the arrow, the multistylus head 7 remains pressed against the intermediate transfer drum 5 having a silicone rubber layer in order to receive recording signals from a drive circuit 200 for sequentially recording ink images on the intermediate transfer drum 5. The reference numeral 36 designates a halogen lamp for heating and reference numeral 37 a reflector.

A pressing roller 35 is used for the image transfer process. The pressing roller 35 is normally apart from the intermediate transfer drum 5, and it presses against the intermediate transfer drum 5 through the recording paper 10 only when the image transfer process is underway.

When the image transfer process is activated, the halogen lamp 36 generates light which is concentrated by the reflector 37 to radiate the surface of the ink image 38 immediately before the recording paper 10 comes into contact with the intermediate transfer drum 5.

As shown in FIG. 6, the color ink sheet 3 is sequentially coated with four colors, black (B), yellow (Y), magenta (M), and cyan (C), on its base film and has a width corresponding to that of the recording paper 10 and a length almost identical to the circumferential length of the intermediate transfer drum 5.

Next, the functional operation of the color recording apparatus reflecting the second embodiment of the present invention is described below. When the recording process is activated, the tip edge of black color of the color ink sheet 3 is at the recording position of the multistylus head 7, whereas the pressing roller 35 is apart from the intermediate transfer drum 5 and the halogen lamp 36 remains off. While this condition is present, the image recording operation is sequentially executed in accordance with a black-recording signal. As in the first embodiment, when the image formation process is underway, the thermally dissolved ink is separated from the color ink sheet 3 and transferred onto the intermediate transfer drum 5. At the moment of completing the recording of black by causing the intermediate transfer drum 5 to fully turn itself, the yellow ink arrives at the recording position of the multistylus head 7 and then is recorded on the intermediate transfer drum 5 by superimposing the recorded black. In this way, a complete color image is eventually formed by sequentially superimposing the color ink images on the intermediate transfer drum 5 in the order of magenta and cyan following the color yellow.

After completing the formation of the four-color ink image, the intermediate transfer drum 5 returns to the transfer position. Simultaneously, the halogen lamp 36 lights up and the feeding of the recording paper 10 is initiated. Then, the pressing roller 35 receives the recording paper 10 and conveys it in the direction shown by the arrow while pressing against the intermediate transfer drum 5. Immediately before the recording paper 10 comes into contact with the intermediate transfer drum 5, the ink image 38 is exposed to the radiating light beam. The ink image 38 then absorbs the light beam and generates heat to be melted. The melted ink image 38 upon exposure to light tightly adheres to the recording paper 10 at the position of the pressing roller 35. Simultaneous with the adhesion to the recording paper 10, the ink image 38 is instantaneously cooled by the recording paper 10 and the intermediate transfer drum 5 to solidify itself. Then, the recording paper 10 is stripped off from the intermediate transfer drum 5 by allowing the whole of the ink image 38 to be transferred onto the recording paper 10.

In this way, after completing those serial processes, a complete color image is eventually formed on the recording paper 10. Like the first embodiment, since the second embodiment strips off the recording paper 10 from the intermediate transfer drum 5 after causing the cooled ink to solidify itself, satisfactory transferability is achieved. In addition, since no residual ink remains on the intermediate transfer drum 5, the recording apparatus embodied by the invention can continuously execute the ensuing image recording processes immediately after completing the recording of a portion of complete color image.

The second embodiment uses the intermediate transfer drum 5 whose surface is composed of a black silicone rubber layer containing an optimum amount of carbon black uniformly dispersed over the entire circumferential surface. The black surface of the intermediate transfer drum 5 effectively absorbs the light beam from the halogen lamp 36 in order to generated heat which melts the ink image 38. When using light-permeable color ink generating a lesser amount of heat, the black surface of the intermediate transfer drum 5 is particularly effective.

The color ink sheet 3 used for the second embodiment contains black ink, yellow ink, magenta ink, and cyan ink in the order of the color superimposition. The viscosities of these four color inks decrementally differ from each other like 48,000 cp of the black, 24,000 cp of the yellow, 12,000 cp of the magenta, and 6,000 cp of the cyan, for example.

This arrangement is extremely effective in the image formation process by sequentially superimposing these color inks. This is because, when separating the melted ink from the intermediate transfer drum 5, the newly coated ink can always be sheared and transferred onto the intermediate transfer drum 5 without causing the ink deposited on the intermediate transfer drum 5 to be sheared.

The second embodiment uses four-color inks having different viscosities from each other. Furthermore, a quite satisfactory result can also be obtained by arranging the black and yellow inks to be slightly above or below 20,000 cp of the viscosity and the magenta and cyan inks slightly above or below 2,000 cp of the viscosity.

Next, a third embodiment of the recording apparatus according to the present invention is described below.

Figure 7:
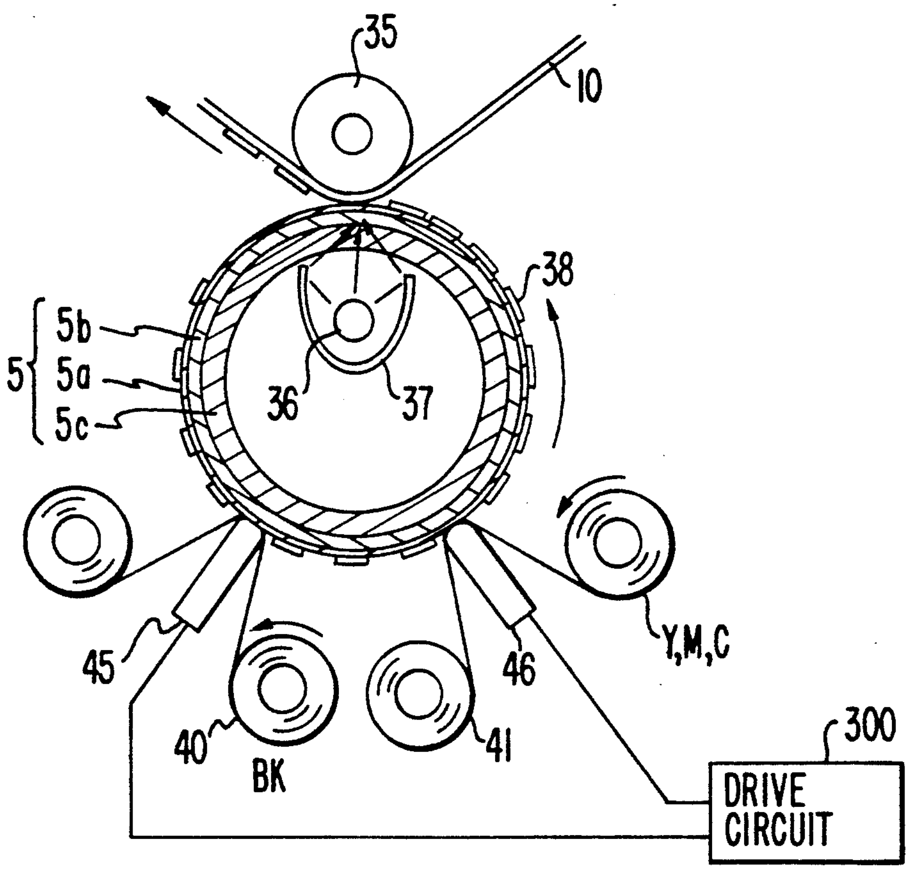
FIG. 7 illustrates a sectional view of a recording apparatus reflecting a third embodiment of the invention.

FIG. 7 illustrates a sectional view of a color recording apparatus reflecting the third embodiment of the present invention. The reference numerals 45 and 46 shown in FIG. 7 respectively designate thermal heads driven by a drive circuit 300 and functioning for generating a fine thermal distribution on the ink sheets 40 and 41. Each of the thermal heads 45 and 46 incorporates a plurality of resistive heating elements which are aligned in correspondence with the recording density. The ink sheet 40 is made of a black-coated base film, whereas the base film of the ink sheet 41 is sequentially coated with yellow, magenta and cyan inks.

The intermediate transfer drum 5 is comprised of a transparent and hollow glass tube 5*c* which is fully covered with a transparent silicone rubber layer 5*b* which is covered with a black silicone rubber layer 5*a* made of a mixture of a transparent silicone rubber and carbon black dispersed therein by an optimum amount. The halogen lamp 36 and the elliptic reflector 37 used for concentrating the light beam are disposed inside of the intermediate transfer drum 5. Like in the second embodiment, the pressing roller 35 used for transferring ink image 38 is normally apart from the intermediate transfer drum 5. After completing the formation of the color ink image 38 on the intermediate transfer drum 5, only when the transfer process is entered, the pressing roller 35 presses against the intermediate transfer drum 5 through the recording paper 10. The elliptic reflector 36 concentrates the light beam at the position immediately before the position where the intermediate transfer drum 5 and the recording paper 10 are pressed together.

Next, the functional operation of the recording apparatus reflecting the third embodiment is described below.

First, the intermediate transfer drum 5 starts to rotate itself while the pressing roller 35 is apart from it and the halogen lamp 36 remains off. The thermal heads 45 and 46 alternately or simultaneously press the ink sheet 40 and 41 onto the intermediate transfer drum 5 to record colors corresponding to those ink sheets 40 and 41 to form the color image 38 on the intermediate transfer drum 5. The halogen lamp 36 lights up when the full-color-recording-completed position very closely approaches the pressing roller 35, and then the pressing roller 35 presses the intermediate transfer drum 5 through the recording paper 10. The light beam concentrated at the position close to the position at which the recording paper 10 comes into contact with the intermediate transfer drum 5 quickly heats the black silicone elastomer layer 5*a* of the intermediate transfer drum 5. The color ink image 38 is melted by this thermal effect and adheres to the recording paper 10. Then, the color ink image 38 is quickly cooled inside of the nipping length in which the recording paper 10 remains in contact with the intermediate transfer drum 5. After the temperature of the color ink image 38 has lowered below the melting point, the color ink image 38 is stripped off from the intermediate transfer drum 5, thus forming a complete color image on the recording paper 10.

In order to firmly adhere the color ink image 38 onto the recording paper 10 and to quickly lower the ink temperature below the melting point in the relatively narrow nipping length, it is preferable that the light beam from the halogen lamp 37 be confined as narrowly as possible so that only the surface skin of the black silicone elastomer layer 5*a* can quickly be heated in an extremely short period of time. If the black silicone elastomer layer 5*a* were heated for a long period, a large volume of heat would spread to the neighboring portions to allow the temperature to rise, and then, the surface skin of the black silicone elastomer layer 5*a* would not be cooled very quickly, and, the cooling efficiency would lower. Accordingly, it is also preferable that the black silicone elastomer layer 5*a* be provided with as thin a thickness as possible, for example, 3 through a maximum of 300 μm of the thickness.

The third embodiment separately provides the black thermal head/ink sheet and the three-color thermal head/ink sheet. As a result, black and the three colors can easily be switched without the need of changing the ink sheet, and the operator can economically use the ink sheets. Furthermore, a complete color image can be recorded on the recording paper 10 at an extremely fast speed by simultaneously activating the thermal heads 45 and 46.

As was explained earlier in the description of the first embodiment, it is preferable that the arrangement of the resistive heating elements of each of the thermal heads 45 and 46 be in a range of 2 to 3 pitches from the stripping position so that the ink sheets 40 and 41 can respectively be separated from the intermediate transfer drum 5 the before temperature of the heated ink lowers below the melting point while the image formation process is underway.

Figure 8:
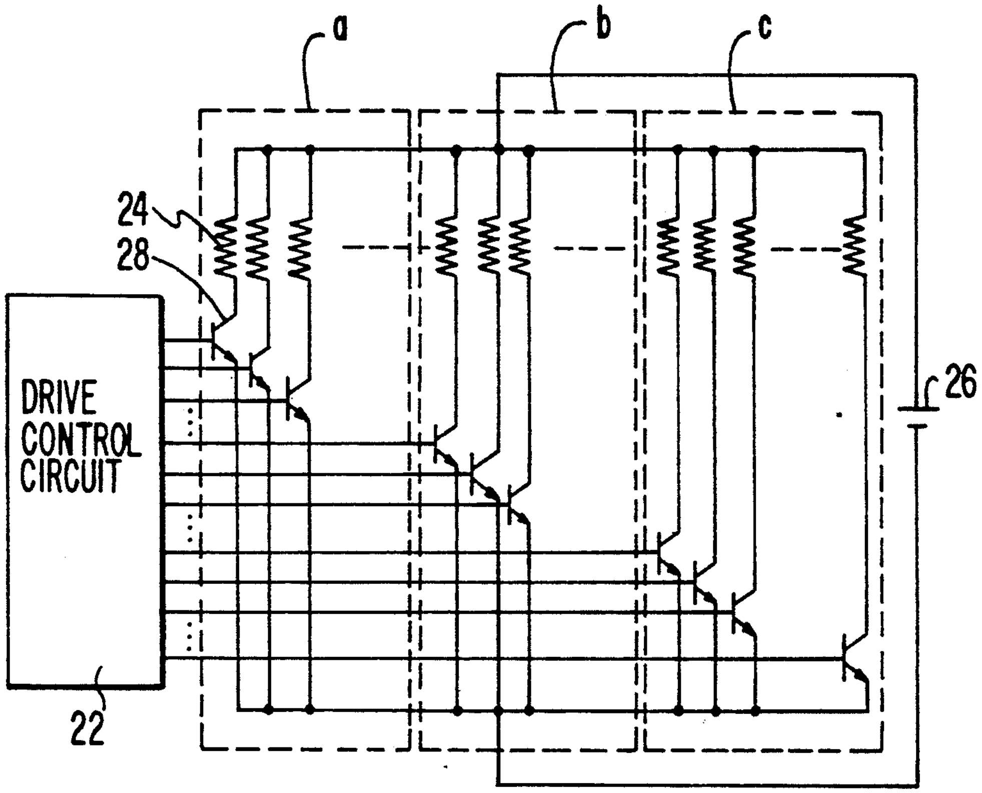
FIG. 8 illustrates a block diagram of a thermal-head driving circuit of the recording apparatus embodied by the invention.

FIG. 8 illustrates a block diagram of the thermal-head drive circuit 300 for driving the thermal heads 45 and 46.

One end of a plurality of resistive heating elements 24 of the thermal heads 45 and 46 are respectively connected to a power-supply source 26. A plurality of switching elements 28 are respectively connected to the other ends of the resistive heating element 24 to selectively allow the flow of current through the resistive heating elements 24 in accordance with control signals from a drive control circuit 22. These resistive heating elements 24 and the switching elements 28 are divided into three groups designated by a, b and c shown in FIG. 8 so that these elements can separately be driven on a group basis.

When the recording process is entered, a system controller (not shown) outputs a drive signal corresponding to an image data to the drive control circuit 22. In response to the drive signal received, the drive control circuit 22 drives the switching elements 28. As a result, in response to the operation of the switching elements 28, those resistive heating elements 24 at the tip portions of the thermal heads 45 and 46 respectively generate heat to melt the thermally soluble ink coated on the ink sheets 40 and 41 in accordance with the signal pattern.

Figure 9:
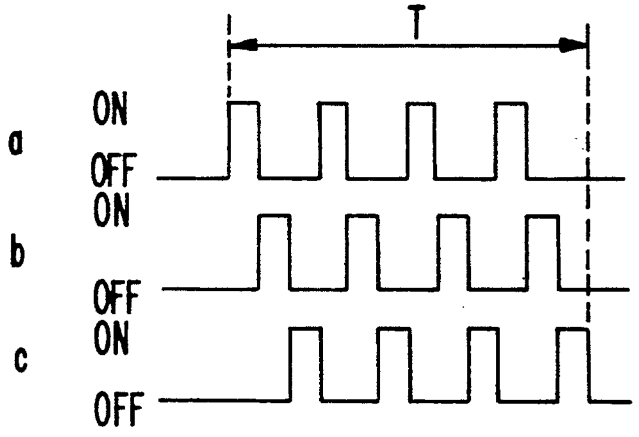
FIG. 9 illustrates a timing chart of signals for driving the resistive heating elements of the drive circuit shown in FIG. 8.
Figure 10:
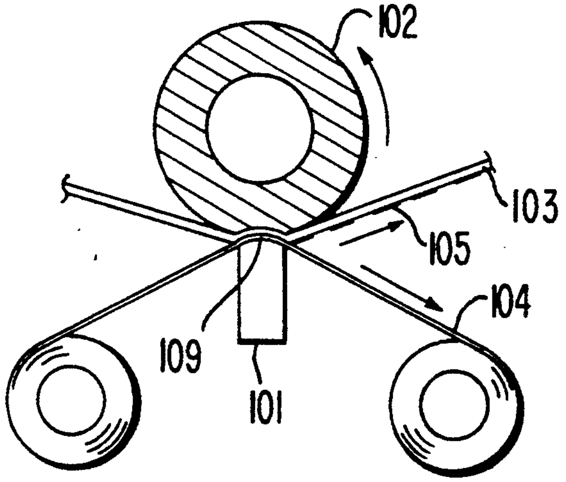
FIG. 10 PRIOR ART
FIG. 10 illustrates a sectional view of a conventional recording apparatus.

As mentioned above, the switching elements 28 are separately driven on the basis of the three groups a, b and c. Those switching elements belonging to each group are driven by the drive signals having the waveforms shown in FIG. 9. Driving of the switching elements 28 is executed on the time-division basis by delaying time so that only a group of switching elements 28 can be driven at each moment. The reason for this is explained below. There are a number of resistive heating elements 24 to be driven, and thus, if all of these elements were simultaneously driven, the voltage flowing through would wires sharply lower. At the same time, depending on the number of the resistive heating elements 24 simultaneously being driven, the energy needed for printing the picture elements becomes uneven to eventually result in the uneven density of the entire picture elements. Occurrence of this faulty phenomenon can be prevented by driving the resistive heating elements on the time-division basis and by decreasing the number of these elements to be driven simultaneously. The character T shown in FIG. 8 designates the printing cycle per picture element. The drive control system executes the time-division driving of the resistive heating elements 24 at four rounds per picture element so that each picture element can be printed by means of four pulses.

It is essential in the third embodiment to strip off the ink sheets 40 and 41 from the intermediate transfer drum 5 while the temperature of the melted ink remains above the melting point. Nevertheless, if the conventional time-division driving were performed against the resistive heating elements 24 to drive them with a single pulse for the printing of each picture element, a long time is needed for stripping off the ink sheets 40 and 41 fromt he intermediate transfer drum 5. This in turn causes the ink temperature to lower in the meanwhile, and as a result, the desired ink image cannot properly be formed.

On the other hand, since the third embodiment prints each picture element by repeating the time-division driving of the resistive heating elements 24 by four rounds, the system can minimize the time needed for stripping off the ink sheets 40 and 41 from the intermediate transfer drum 5 after the dissolution of the ink. This is very effective for stripping off the ink sheets 40 and 41 before the temperature of the ink lowers below the melting point.

It may be apparent that the third embodiment can be modified to have three or more thermal heads and use three or more ink sheets each being coated with at least one color ink.

As is clear from the foregoing description, in summary, the recording apparatuses embodied by the present invention feature those advantages described below.

The intermediate transfer medium having the circumferential surface composed of a silicone rubber layer is extremely pliable and releasable, and thus, the pliable surface not only perfectly fits even the minimal concave and convex surfaces of the recording paper, but it also forms a distinct and clear image on any recording paper including bond paper having substantial concave and convex portions on its surface.

Since the intermediate transfer medium transfers the entirety of the ink onto the recording paper, the operator can dispense with the cleaning of the intermediate transfer medium, and furthermore, the intermediate transfer medium is merely provided with simple structure.

After superimposing a plurality of ink colors and recording them on the intermediate transfer medium, all of the recorded colors are simultaneously transferred onto the recording paper. By virtue of this advantageous structure, the recording apparatus can perform matching of the position of plural colors with an extreme precision.

There is no need of reciprocating the recording paper many times, and thus, the paper-feeding mechanism can be simplified, and accordingly, mechanical failures rarely occur.

The recording apparatus dispenses with the paper clamper to precisely forward the cut-off paper, and the recordable blank portion can be minimized.

In the above embodiments, the silicone rubber layer may be replaced by any other silicone elastomer layer including a silicone resin layer.

What is claimed is:

1. A recording apparatus comprising:

an intermediate transfer medium having a surface composed of a silicone elastomer layer;

an ink sheet having a base film which is coated with a thermo-plastic ink on a surface thereof;

ink-sheet transfer means for sequentially transferring said ink sheet along a predetermined passage which includes a contact position at which said ink sheet comes into contact with said intermediate transfer medium and a separating position at which said ink sheet is bent in a direction to be forcedly separated from said intermediate transfer medium;

a thermal head for selectively heating said ink sheet brought into contact with said intermediate transfer medium at said contact position so that said thermo-plastic ink selectively adheres to said intermediate transfer medium to form an ink image on said intermediate transfer medium, wherein said thermal head comprises a plurality of resistive heating elements arranged in a row at a distance within a 3-line pitch from said separating position, and is driven by a drive means for driving said thermal head at a maximum cycle time of 2 ms/line, whereby said ink sheet remains heated above a melting point or softening point of said thermo-plastic ink at said separating position; and, transfer means for transferring the ink image formed on said intermediate transfer medium to a recording paper, said transfer means including heating means for heating the ink image formed on said intermediate transfer medium, and pressing means for pressing the recording paper onto said intermediate transfer medium.

2. A recording apparatus comprising:

an intermediate transfer medium having a surface composed of a silicone elastomer layer;

an ink sheet having a base film which is coated with a thermo-plastic ink on a surface thereof, said thermo-plastic ink having a melting point or softening point;

ink-sheet transfer means for sequentially transferring said ink sheet along a predetermined passage which includes a contact position at which said ink sheet comes into contact with said intermediate transfer medium and a separating position at which said ink sheet is bent in a direction to be forcedly separated from said intermediate transfer medium;

thermal-image formation means for selectively heating said ink sheet brought into contact with said intermediate transfer medium at said contact position so that said thermo-plastic ink selectively adheres to said intermediate transfer medium to form an ink image on said intermediate transfer medium, wherein a moving speed of said intermediate transfer medium, a structure of said thermal-image formation means and said separating position are cooperatively arranged so that said ink sheet remains heated above the melting point or softening point of said thermo-plastic ink at said separating position; and, transfer means for transferring the ink image formed on said intermediate transfer medium to a recording paper, said transfer means including a heating means for heating the ink image formed on said intermediate transfer medium above the melting point or the softening point of said thermo-plastic ink, and a pressing means for pressing the recording paper onto said intermediate transfer medium until the ink image having transferred to said recording paper cools down below the melting point or the softening point of said thermo-plastic ink;

wherein said intermediate transfer medium comprises a transparent hollow body whose outer periphery is covered with a black silicone elastomer layer and wherein said heating means is disposed inside of said hollow body and comprises a lamp and a beam-concentrating reflector for instantaneously and locally heating said black silicone elastomer layer at a position immediately before said pressing means presses the recording paper onto said intermediate transfer medium.

3. A recording apparatus as set forth in claim 2, wherein said black silicone elastomer layer has a maximum thickness of 300 $\mu$m.

4. A recording apparatus comprising:

an intermediate transfer medium having a surface composed of a silicone elastomer layer;

an ink sheet having a base film which is coated with a thermo-plastic ink on a surface thereof, said thermo-plastic ink having a melting point or softening point;

ink-sheet transfer means for sequentially transferring said ink sheet along a predetermined passage which includes a contact position at which said ink sheet comes into contact with said intermediate transfer medium and a separating position at which said ink sheet is bent in a direction to be forcedly separated from said intermediate transfer medium;

a thermal head for selectively heating said ink sheet brought into contact with said intermediate transfer medium at said contact position so that said thermo-plastic ink selectively adheres to said intermediate transfer medium to form an ink image on said intermediate transfer medium, wherein said thermal head incorporates a plurality of resistive heating elements arranged in a row at a maximum distance of a 3-line pitch from said separating position, and is driven by a drive means for driving said thermal head at a maximum cycle time of 2 ms/line, whereby said ink sheet remains heated above the melting point or softening point of said thermo-plastic ink at said separating position; and, transfer means for transferring the ink image formed on said intermediate transfer medium to a recording paper, said transfer means including a heating means for heating the ink image formed on said intermediate transfer medium above the melting point or the softening point of said thermo-plastic ink, and a pressing means for pressing the recording paper onto said intermediate transfer medium until the ink image having transferred to said recording paper cools down below the melding point or the softening point of said thermo-plastic ink.

* * * * *